US011862118B2

(12) United States Patent
Matsui

(10) Patent No.: US 11,862,118 B2
(45) Date of Patent: Jan. 2, 2024

(54) DISPLAY DATA PROCESSING DEVICE, IMAGE DISPLAY SYSTEM, AND DISPLAY DATA PROCESSING METHOD

(71) Applicant: Sharp NEC Display Solutions, Ltd., Tokyo (JP)

(72) Inventor: Katsuyuki Matsui, Tokyo (JP)

(73) Assignee: Sharp NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 18/088,338

(22) Filed: Dec. 23, 2022

(65) Prior Publication Data

US 2023/0147884 A1    May 11, 2023

Related U.S. Application Data

(63) Continuation of application No. PCT/JP2020/030959, filed on Aug. 17, 2020.

(51) Int. Cl.
*G09G 3/36* (2006.01)

(52) U.S. Cl.
CPC ....... *G09G 3/36* (2013.01); *G09G 2320/0242* (2013.01); *G09G 2320/0247* (2013.01);
(Continued)

(58) Field of Classification Search
CPC ............. G09G 3/36; G09G 2320/0247; G09G 2320/0276; G09G 2360/16
See application file for complete search history.

(56) References Cited

U.S. PATENT DOCUMENTS

| 2003/0156225 A1* | 8/2003 | Ito ........................... H04N 5/20 348/E5.073 |
| 2004/0051790 A1 | 3/2004 | Tamaru et al. |

(Continued)

FOREIGN PATENT DOCUMENTS

| JP | H 05-083598 A | 4/1993 |
| JP | 2002-044681 A | 2/2002 |

(Continued)

OTHER PUBLICATIONS

International Search Report (ISR) (PCT Form PCT/ISA/210), in PCT/JP2020/030959, dated Oct. 13, 2020.

*Primary Examiner* — Gene W Lee
(74) *Attorney, Agent, or Firm* — McGinn I.P. Law Group, PLLC

(57) ABSTRACT

A display data processing device performs color adjustment on gradation values of pixels of a frame image of an input video signal and outputs the adjusted gradation values to a display device. The device includes a first gamma correction unit configured to set the gradation value as the first input gradation value and to convert the first input gradation value into the first corrected gradation value. The device includes a video gain correction unit configured to perform color adjustment on the first corrected gradation value according to video gain correction and to output the result as a video gain corrected gradation value. The device includes a second gamma correction unit configured to set the video gain corrected gradation value as the second input gradation value and to convert the second input gradation value into the second corrected gradation value.

8 Claims, 10 Drawing Sheets

(52) U.S. Cl.
CPC .............. *G09G 2320/0252* (2013.01); *G09G 2320/0276* (2013.01); *G09G 2320/043* (2013.01); *G09G 2320/0626* (2013.01); *G09G 2354/00* (2013.01); *G09G 2360/16* (2013.01)

(56) References Cited

U.S. PATENT DOCUMENTS

| | | | |
|---|---|---|---|
| 2004/0061709 A1* | 4/2004 | Park | G09G 3/2059 345/690 |
| 2004/0257310 A1* | 12/2004 | Yu | G09G 3/2803 345/63 |
| 2005/0088373 A1* | 4/2005 | Lee | G09G 3/2803 345/60 |
| 2010/0123740 A1 | 5/2010 | Inoue et al. | |
| 2012/0274798 A1 | 11/2012 | Takahashi et al. | |
| 2017/0011690 A1* | 1/2017 | Oya | G09G 3/3426 |
| 2022/0130347 A1* | 4/2022 | Niizuma | G09G 5/10 |

FOREIGN PATENT DOCUMENTS

| | | | |
|---|---|---|---|
| JP | 2004-032171 A | | 1/2004 |
| JP | 2009086222 A | * | 4/2009 |
| JP | 2009-122367 A | | 6/2009 |
| JP | 2009205128 A | * | 9/2009 |
| JP | 2011-035894 A | | 2/2011 |
| JP | 4869959 B2 | * | 2/2012 |
| JP | 6968678 B2 | * | 11/2021 |
| WO | WO 2008/136358 A1 | | 11/2008 |
| WO | WO-2013027277 A1 | * | 2/2013 |

* cited by examiner

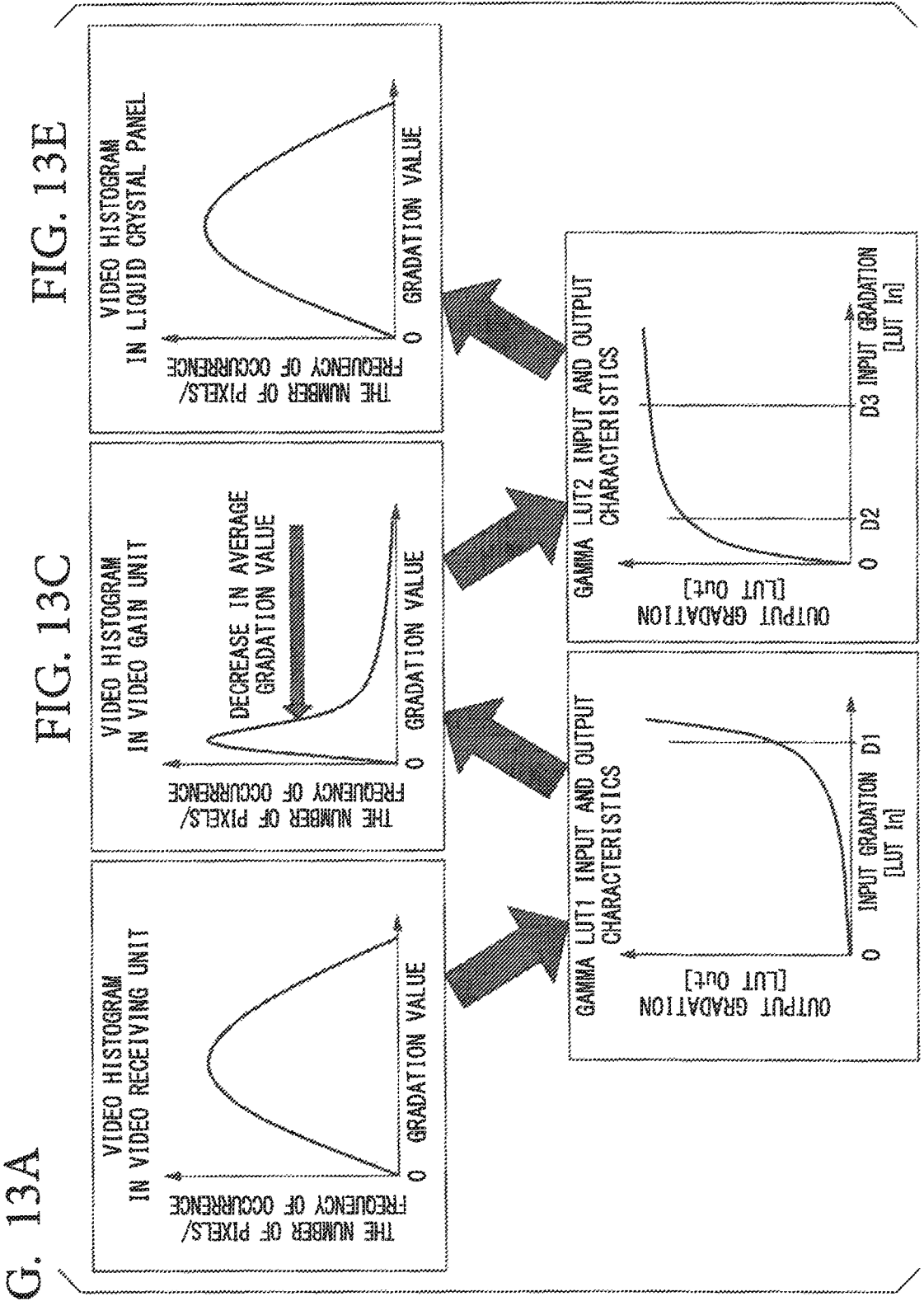

DISPLAY DATA PROCESSING DEVICE, IMAGE DISPLAY SYSTEM, AND DISPLAY DATA PROCESSING METHOD

TECHNICAL FIELD

The present invention relates to a display data processing device, an image display system, and a display data processing method for adjusting a balance of white color components red, green, and blue (R, G, and B).

BACKGROUND ART

Conventionally, control of image quality such as brightness, contrast, color tone, and chromaticity of an image displayed on a display screen of a display device has been performed by adjusting the balance of color components R, G, and B of white on the display screen (for example, refer to Patent Document 1, Patent Document 2, and Patent Document 3).

A method for white point adjustment in Patent Document 1 described above is a general method used in television display devices and display devices. The display device of Patent Document 1 includes, as shown in FIG. 7, a video receiving unit 101, a video gain correction unit 102, a gamma LUT correction unit 103, and a liquid crystal panel 104.

Further, in FIG. 7, the video gain correction unit 102 adjusts gradation values of the color components R, G, and B according to video gain correction to perform white point adjustment of a display screen.

In addition, a method for white point adjustment in Patent Document 2 is a method used in display devices used in video production where accurate color reproduction is required. The display device of Patent Document 2 has the same configuration as that of Patent Document 1.

Further, in the configuration of FIG. 7, the gamma LUT correction unit 103 performs white point adjustment of a display screen by gamma LUT adjustment. For this reason, an input gradation value and an output gradation value in a gamma LUT of each of the color components R, G, and B are recalculated, and the gamma LUT is rewritten.

A method for white point adjustment in Patent Document 3 described above is, like Patent Document 2, a method used in display devices used in video production where accurate color reproduction is required. A display device of Patent Document 3 includes, as shown in FIG. 8, a video receiving unit 101, a gamma LUT1 correction unit 202, a video gain correction unit 203, a gamma LUT2 correction unit 204, and a liquid crystal panel 104.

In Patent Document 3, the video gain correction unit 203 performs white point adjustment of a display screen by performing color adjustment according to video gain correction.

CITATION LIST

Patent Document

[Patent Document 1]
Japanese Unexamined Patent Application, First Publication No. 2002-044681
[Patent Document 2]
Japanese Unexamined Patent Application, First Publication No. 2009-122367

[Patent Document 3]
Republished Japanese Translation No. 2008-136358 of the PCT International Publication for Patent Applications.

SUMMARY OF INVENTION

Technical Problem

In the white point adjustment described above, when image quality is set to suit the taste of a viewer, or when it is caused to respond to changes in brightness of surrounding environmental light, it is necessary to change the brightness and chromaticity of a display screen continuously (smoothly) over time for a given amount of adjustment.

In addition, during the warm-up period of a display device after power is turned on, and when a display color is corrected due to aging deterioration of the display device, it is necessary to keep the image quality of the display screen constant by changing the display color continuously over time according to the given amount of adjustment.

However, in the case of white point adjustment in Patent Document 1, the gradation characteristics of the color components R, G, and B, which should be constant, change, the degree of change varies for each of the color components R, G, and B, and significant image quality deterioration such as gray gradation occurs. FIGS. 9 and 10 are diagrams which show graphs of gamma (gradation) characteristics in display characteristics of a display device. The horizontal axis indicates a gradation degree [0-255] of the color components R, G, and B, and the vertical axis indicates a screen brightness value [0-1] of the color components R, G, and B. Here, the screen brightness value is a numerical value obtained by normalizing the brightness value of 255 gradations, which is the maximum gradation value of the color components R, G, and B, as 1.

FIG. 9 shows gamma characteristics before white point adjustment, and FIG. 10 shows gamma characteristics after white point adjustment. As shown in FIG. 9, in the gamma characteristics before white point adjustment, characteristic curves of the color components R, G, and B have the same shape and overlap each other. On the other hand, in the gamma characteristics after white point adjustment, as shown in FIG. 10, shapes of characteristic curves of the color components R, G, and B are different and there are areas that do not overlap each other.

In FIG. 10, the shapes of the characteristic curves of the color components R, G, and B are different in an intermediate area of 0 to 255 that is a gradation value range of 256 gradations. For this reason, for example, in 128 gradations of intermediate value, a ratio of the color components R, G, and B is not in a 1:1:1 relationship, and image quality deterioration such as brightness change and coloring occurs in gray.

For example, in the range of 0-255 gradations, when gain adjustment is performed in 255 gradations, a screen brightness value Y after white point adjustment can be obtained using the following Equation (1).

$$Y = f(k1 \times x) \tag{1}$$

In Equation (1) described above, f(x) indicates a function of a combined gamma characteristic obtained by combining gamma characteristics of the gamma LUT correction unit 103 and the liquid crystal panel 104 in FIG. 7. x indicates a gradation value, and a constant adjustment ratio k1 ($0 \le k1 \le 1$) indicates a video gain.

In gradation characteristics (for example, high dynamic range (HDR) standard characteristics) or the like that are generally used, there is a gamma characteristic in which adjustment ratios k1 and k2 satisfying the following Equation (2) do not exist.

$$k2 \times f(x) = f(k1 \times x) \qquad (2)$$

If Equation (2) described above is not established, this indicates that f(k1 xx) based on a gradation x corrected using the adjustment ratio k1 set as a video gain does not match a result of multiplying a function f(x) by an adjustment ratio k2 (a constant video gain), that is, there is no adjustment ratio k1 with which the function f(x) can be changed in the same manner at any gradation x. In addition, the function f(x) corresponding to each of the color components R, G, and B has different change characteristics.

Therefore, the curves of the color components R, G, and B have different shapes, as shown in FIG. 10, after performing video gain correction on the curves of the color components R, G, and B before video gain correction of FIG. 9 according to characteristics of each function f(x).

In addition, in the case of white point adjustment in Patent Document 2, as already described, the gamma LUT correction unit 103 performs white point adjustment by changing the gamma LUT that corrects the gamma characteristics. For this reason, in Patent Document 2, since an appropriate corrected value is obtained for each gradation, like Patent Document 1, image quality deterioration does not occur as a result of white point adjustment.

However, each time white point adjustment is performed, the gamma LUT for performing gamma correction needs to be rewritten by calculating a corrected value according to color adjustment at that time, and it takes more time than video gain adjustment.

For this reason, during white point adjustment processing, because gamma correction values change abruptly at a timing of updating the gamma LUT, the screen flickers and noise is visible.

In addition, it takes time to calculate and rewrite the gamma correction values in the gamma LUT, and it cannot follow a color adjustment operation of a user. For this reason, changes in an image display that make it difficult for a viewer to perform white point adjustment occur, such as a color of a screen not changing continuously over time for color adjustment but changing in a scattered step shape.

In addition, in the case of white point adjustment in Patent Document 3, image quality deterioration such as crushed shadows and crushed gradation occurs in a gradation area of a dark portion, that is, at a gradation degree near 0 gradation.

FIGS. 11 and 12 are diagrams which show the graphs of the gamma (gradation) characteristics in the display characteristics of a display device. The horizontal axis indicates a gradation range of a gradation degree [0-32] corresponding to a dark area of the color components (R, G and B), and the vertical axis indicates a screen brightness value [0-1] of the color components (R, G, and B). Here, the screen brightness value is a numerical value nominalized by brightness values of 255 gradations of color components (R, G, and B).

FIG. 11 shows ideal gamma characteristics of a display device, and FIG. 12 shows the gamma characteristics of a display device 200 of FIG. 8. As shown in FIG. 11, in the ideal gamma characteristics, shapes of characteristic curves of the color components (R, G, and B) have curves in which a change in normalized brightness value corresponds to a change in gradation and is continuous with time (smooth). On the other hand, as shown in FIG. 12, in the gamma characteristics of the display device 200 in FIG. 8, the shapes of the characteristic curves of the color components (R, G, and B) of the dark area have a graph that changes discontinuously (roughly) with time in a stepwise manner. The stepwise change in the characteristic curves indicates that image quality deterioration such as crushed shadows and crushed gradation (skipped gradation) has occurred.

FIGS. 13A through 13E are diagrams which describe factors that cause a graph to have a gamma characteristic curve after white point adjustment changing stepwise and discontinuously.

FIG. 13A is a histogram which shows the number of pixels (or frequency of occurrence) of gradation values in each frame of the video signal supplied to the video receiving unit 101 in the configuration shown in FIG. 8. The histogram in FIG. 13A shows a shape of a normal distribution.

FIG. 13B shows a graph having a gamma characteristic curve of LUT1 used for gamma correction in the gamma LUT1 correction unit 202 (for example, user setting gamma characteristics corresponding to HDR standard characteristics). In the graph in FIG. 13B, the horizontal axis indicates a gradation (input gradation) value that is input and the vertical axis indicates a gradation (output gradation) value that is corrected and output. The graph in FIG. 13B has a shape with a slope that is small up to a position D1 where an input gradation becomes a predetermined gradation value, and sharply increases from the position D1. For this reason, gradation values of the dark area show a shape in which they are corrected lower than the gradation values after them.

FIG. 13C shows a histogram of gradation values of a video signal corrected by the gamma correction curve of FIG. 13B. The histogram of FIG. 13C is a histogram that shows the number of pixels (or the frequency of occurrence) of gradation values in a frame of a video signal supplied to the gamma LUT2 correction unit 204 in the configuration shown in FIG. 8. In FIG. 13C, the horizontal axis indicates a gradation value, and the vertical axis indicates the number of pixels (or the frequency of occurrence).

In FIG. 13C, as a result of correction by the gamma characteristic curve in FIG. 13B, a center of the distribution shifts toward a lower gradation value as a whole, resulting in a histogram with a shape biased towards the dark area. That is, it indicates that an input gradation up to a position D1 is corrected to a lower gradation by gamma correction of the gamma *LUT*1 correction unit 202.

FIG. 13D shows gamma characteristics of an LUT2 used for gamma correction in the gamma LUT2 correction unit 204 (reverse gamma characteristics of a liquid crystal panel). In a graph in FIG. 13D, the horizontal axis indicates an input gradation value which is input and the vertical axis indicates an output gradation value which is corrected and output. The graph of FIG. 13D has a slope increasing up to a position D2 where an input gradation becomes a predetermined gradation value and sharply decreasing from the position D2. For this reason, the gradation values of the dark area show a shape in which they are corrected higher than the gradation values after them.

FIG. 13E shows a histogram of the gradation values of a video signal corrected by the gamma correction curve of FIG. 13D. The histogram of FIG. 13E is a histogram that shows the number of pixels (or the frequency of occurrence) of the gradation values in the frame of a video signal supplied to the liquid crystal panel 104 in the configuration shown in FIG. 8. In FIG. 13E, the horizontal axis indicates a gradation value, and the vertical axis indicates the number of pixels (or the frequency of occurrence).

In FIG. 13(e), as a result of correction by the gamma characteristic curve of FIG. 13(d), compared to the histogram in FIG. 13(c), a center of the distribution shifts toward a higher gradation value as a whole, resulting in a histogram that is similar in shape to the normal distribution. That is, it indicates that an input gradation up to a position D3 is corrected to a higher gradation by gamma correction of the gamma LUT2 correction unit 204.

As described above, since the slope of the gamma correction curve in the dark area up to the position D2 is large, continuous changes in input gradation are quantized, that is, a plurality of continuous input gradation values are converted into the same output gradation.

As a result, a shape of the characteristic curve of the color components (R, G, and B) in the dark area shown in FIG. 12 becomes a graph that changes discontinuously stepwise due to occurrence of image quality deterioration such as crushed shadows and crushed gradation (skipped gradation).

In Patent Documents 1 and 3, a color of a display screen changes smoothly when white point adjustment is performed, but the image quality deterioration described above (coloring to gray gradation, crushed shadows, crushed gradation, and the like) occurs on the display screen.

On the other hand, in Patent Document 2, the image quality deterioration does not occur when white point adjustment is performed, but flickering on the display screen and noise occurrence cannot follow the operation of a user.

In this manner, there is a trade-off relationship between suppression of image quality deterioration on the display screen during white point adjustment and improvement in speed of color adjustment on the display screen.

In view of the problems described above, an object of the present invention is to provide a display data processing device, an image display system, and a display data processing method that smoothly change the color of the display screen and do not cause image quality deterioration on the display screen by improving the speed of color adjustment on the display screen when color adjustment such as white point adjustment is performed.

Solution to Problem

According to the present invention, a display data processing device that performs color adjustment on gradation values of pixels of a frame image of an input video signal and outputs the adjusted gradation values to a display device includes a first gamma correction unit configured to, based on first composite correction information according to a first gamma characteristic indicating a correspondence relationship between a first input gradation value and a first normalized brightness value and a first power function indicating a correspondence relationship between the first normalized brightness value and a first corrected gradation value, set the gradation value as the first input gradation value and to convert the first input gradation value into the first corrected gradation value, a video gain correction unit configured to perform color adjustment on the first corrected gradation value according to video gain correction and to output the result as a video gain corrected gradation value, and a second gamma correction unit configured to, based on second composite correction information according to a second power function having the same power as the first power function, which indicates a correspondence relationship between a second input gradation value and a second normalized brightness value, and a second gamma characteristic indicating a correspondence relationship between the second normalized brightness value and a second corrected gradation value, set the video gain corrected gradation value as the second input gradation value and to convert the second input gradation value into the second corrected gradation value.

According to the present invention, an image display system includes the display data processing device described above and a display device for displaying an image according to the second corrected gradation value, in which the second gamma characteristic is a gamma characteristic of the display device.

According to the present invention, a display data processing method for performing color adjustment on gradation values of pixels of a frame image of an input video signal and outputting the adjusted gradation value to a display device includes a first gamma correction process of setting, by a first gamma correction unit, based on first composite correction information according to a first gamma characteristic indicating a correspondence relationship between a first input gradation value and a first normalized brightness value and a first power function indicating a correspondence relationship between the first normalized brightness value and a first corrected gradation value, the gradation value as the first input gradation value and converting the first input gradation value into the first corrected gradation value, a video gain correction process of a video gain correction unit performing color adjustment on the first corrected gradation value according to video gain correction by a video gain correction unit and outputting the adjusted gradation value as a video gain corrected gradation value, and a second gamma correction process of setting, by a second gamma correction unit, based on second composite correction information according to a second power function having the same power as the first power function, which indicates a correspondence relationship between a second input gradation value and a second normalized brightness value, and a second gamma characteristic indicating a correspondence relationship between the second normalized brightness value and a second corrected gradation value, the video gain corrected gradation value as the second input gradation value and converting the second input gradation value into the second corrected gradation value.

Advantageous Effects of Invention

The present invention can provide a display data processing device, an image display system, and a display data processing method that smoothly change a color of a display screen and do not cause image quality deterioration on the display screen by improving a speed of color adjustment on the display screen when color adjustment such as white point adjustment is performed.

BRIEF DESCRIPTION OF DRAWINGS

FIGS. 13A through 13E are diagrams for describing factors that result in a graph in which a gamma characteristic curve after a point adjustment discontinuously changes stepwise.

DESCRIPTION OF EMBODIMENTS

Figure 1:
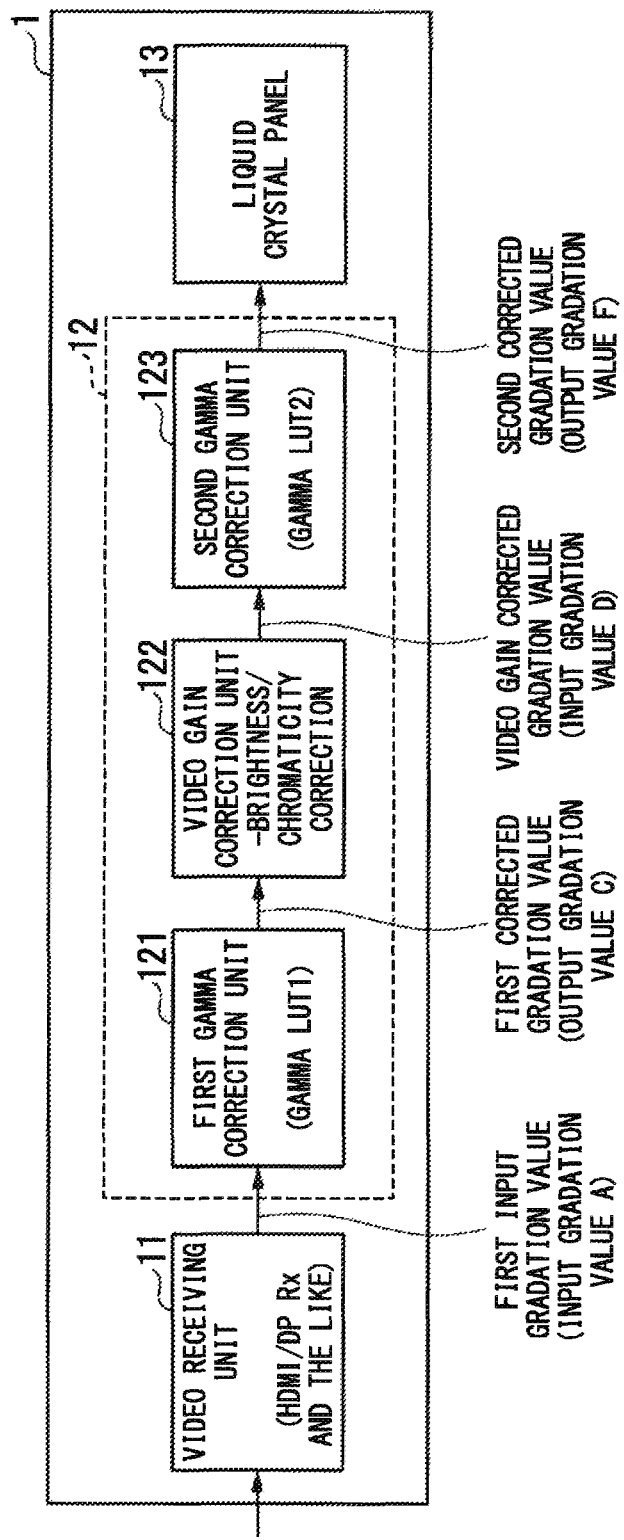
FIG. 1 is a diagram which shows a configuration example of an image display system using a display data processing device according to one embodiment of the present invention.

Hereinafter, a display data processing device according to an embodiment of the present invention will be described with reference to the drawings. FIG. 1 is a diagram which shows a configuration example of an image display system using a display data processing device according to an embodiment of the present invention. As shown in FIG. 1, an image display system 1 includes a video receiving unit 11, a display data processing device 12, and a liquid crystal panel 13. The display data processing device 12 includes each of a first gamma correction unit 121, a video gain correction unit 122, and a second gamma correction unit 123.

The video receiving unit 11 is a High-Definition Multimedia Interface (HDMI: registered trademark)/Display Port (DP)_Receiver (Rx), or the like.

In addition, the video receiving unit 11 receives a video signal from an external device to perform waveform shaping, and the like, and then outputs this video signal to the display data processing device 12.

The display data processing device 12 corrects a gradation value of a pixel of a frame in the video signal according to a user setting gamma characteristic (a first gamma characteristic) and a liquid crystal panel gamma characteristic (a second gamma characteristic) of the liquid crystal panel 13 (to be detailed below).

In addition, the display data processing device 12 corrects color adjustment (brightness adjustment, chromaticity adjustment, and the like) of each of displayed color components R, G, and B.

The liquid crystal panel 13 is an example of a display device. The display data processing device 12 according to the present embodiment can also be used as a display device for a plasma display, a Cathode Ray Tube (CRT), a projector, and the like.

In the display data processing device 12, the first gamma correction unit 121 converts a first input gradation value (an input gradation value A) of each pixel of the color components R, G, and B of the video signal into a first corrected gradation value (an output gradation value C) corresponding to the user setting gamma characteristics (for example, the HDR standard characteristics).

Here, the first gamma correction unit 121 includes, for example, a first gamma correction lookup table (LUT) referred to when the first input gradation value of the pixel of the video signal is converted into the first corrected gradation value.

Figure 2:
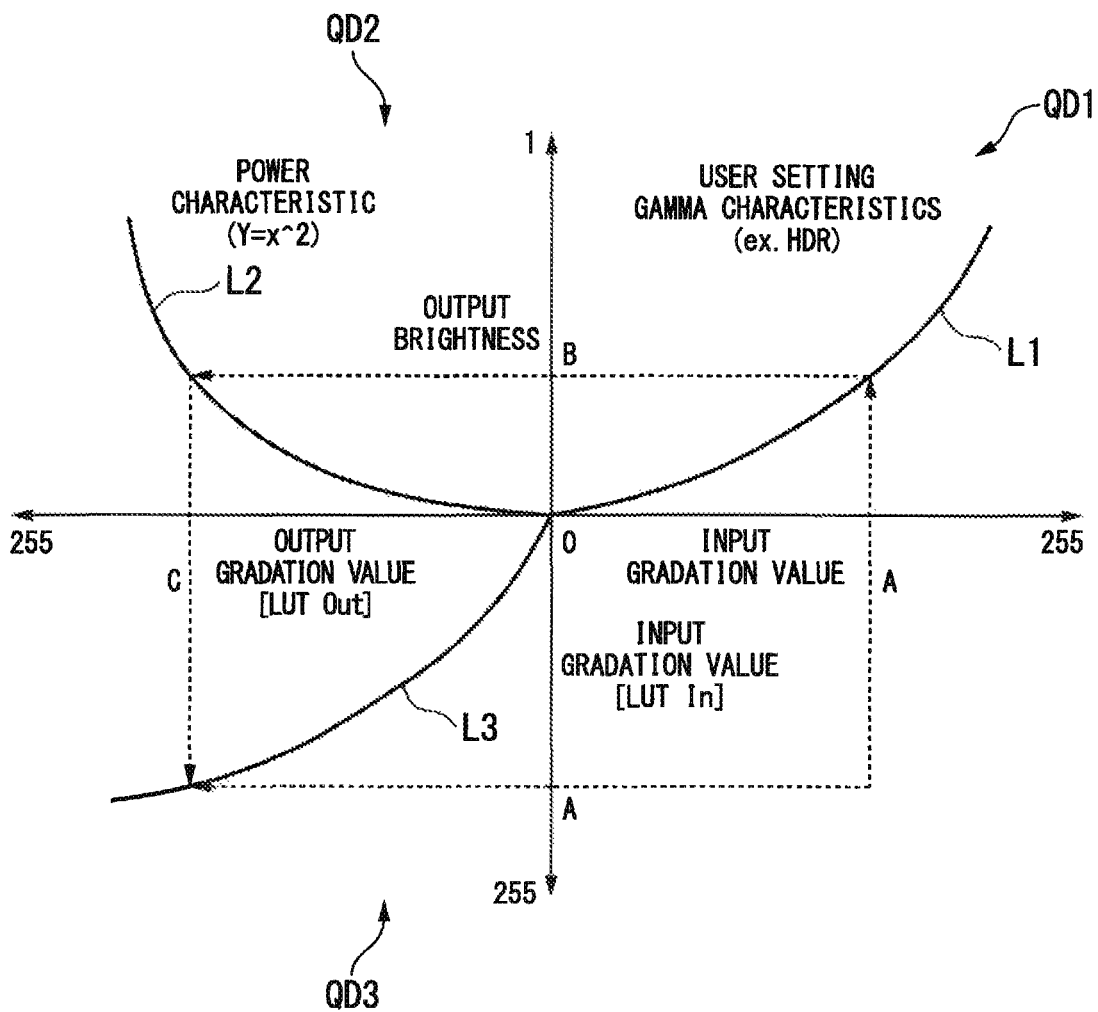
FIG. 2 is a conceptual diagram for describing gamma characteristics of a first gamma correction LUT.

FIG. 2 is a conceptual diagram which describes gamma characteristics of the first gamma correction LUT.

In FIG. 2, a third quadrant QD3 indicates the gamma characteristics of the first gamma correction LUT. In addition, a first quadrant QD1 and a second quadrant QD2 indicate a method of generating the first gamma correction LUT.

The first gamma correction LUT is a table which describes a correspondence between the input gradation value A and the output gradation value C, indicated by a gamma characteristic curve L3 shown in the third quadrant QD3. The input gradation value A is the gradation value input to the first gamma correction unit 121. The gradation value of each pixel of the color components R, G, and B in each frame of a video signal supplied from the video receiving unit 11 serves as the input gradation value A. In addition, the first corrected gradation value is an output gradation value C corresponding to the input gradation value A on the gamma characteristic curve L3 in FIG. 2.

In the third quadrant QD3, a graph of the gamma characteristic curve L3 shows the input gradation value A on the vertical axis and the output gradation value C on the horizontal axis.

The gamma characteristic curve L3 is generated using a first gamma characteristic curve L1 indicating the user setting gamma characteristic in the first quadrant QD1 and a power curve L2 in the second quadrant QD2. The Power curve L2 is the curve of a predetermined power function (for example, square function).

In the graph of the first gamma characteristic curve L1, the horizontal axis indicates the input gradation value A, and the vertical axis indicates a normalized brightness value B (a first normalized brightness value). The input gradation value A indicates gradation values of pixels in the frame of a video signal. The normalized brightness value B indicates a brightness value obtained by normalizing brightness values less than a maximum brightness value by setting the maximum brightness value of each of the color components R, G, and B to 1.

Here, the maximum brightness value is a brightness value at the maximum gradation value of 255 when the color components R, G, and B have gradations of 255.

The power curve L2 is shown by the following Equation (3).

$$Y=(x/255)^n \qquad (3)$$

In Equation (3) described above, Y is the normalized brightness value B and x is the output gradation value C described above. 255 is an example of the maximum gradation value that the liquid crystal panel 13 uses for display. In a graph of the power curve L2 of a predetermined power function, the horizontal axis indicates the output gradation value C (the power root of the power function), and the vertical axis indicates the normalized brightness value B (the first normalized brightness value), which is an output value of the power function. A power (exponent) n of the power function is preferably in a range of $1 \le n \le 3$. Moreover, when a power n of the power function is 2 (n=2), a calculation load can be reduced.

The gamma characteristic curve L3 of the first gamma correction LUT is generated by the following processing. By setting each of a gradation value 0 to the gradation value 255 as the input gradation value A, the first normalized brightness value is obtained as the normalized brightness value B corresponding to each of the input gradation values A on the first gamma characteristic curve L1.

Then, on the power curve L2, the output gradation value C is obtained as a power root corresponding to the normalized brightness value B described above. At this time, since the power curve L2 is a power function of Equation (3), the output gradation value C is obtained as $Y^{1/n}*255$, which is a power root x of the power function of Equation (3). If Y is the normalized brightness value B (the first normalized brightness value), the power root x is $B^{1/n}*255$. Here, the normalized brightness value B is a power value of the power function of Equation (3). In addition, the output gradation value C is obtained as the power root x of the normalized brightness value B.

In addition, when n=2, Equation (3) becomes a square function and a square root (the power root) x is $Y^{1/2}*255$. If a squared value Y is the normalized brightness value B, the square root x is $B^{1/2}*255$.

As described above, the normalized brightness value B (the first normalized brightness value) in the first gamma characteristic curve L1 of the user setting gamma characteristic is set to a power value on the power curve L2 of a power function of the same value. Then, the output gradation value C is obtained as a power root corresponding to the power value of the power curve L2.

As a result, when the input gradation value A is input, the gamma characteristic curve L3 is obtained as a curve that shows a relationship between the input gradation value A and the output gradation value C obtained by the processing described above.

That is, the input gradation value A on the gamma characteristic curve L3 is converted into the output gradation value C as a power root of the power curve L2 corresponding to the normalized brightness value B.

In this manner, since the output gradation value C is obtained as the power root of the power curve L2, a curve shape of the gamma characteristic curve L3 is set to a shape approximating to a straight line. Here, when a curve shape of the power curve L2 is a square characteristic of a power 2, calculation for obtaining the output gradation value C corresponding to the normalized brightness value B on the power curve L2 becomes calculation for obtaining a square root (a so-called square root) and becomes easier.

Next, in the display data processing device 12, the second gamma correction unit 123 inputs a video gain corrected gradation value (a video gain corrected gradation value) of the pixels of a video signal supplied from the video gain correction unit 122 as the input gradation value D. Then, the second gamma correction unit 123 converts the input gradation value D into an output gradation value F (a second corrected gradation value) corresponding to the liquid crystal panel gamma characteristic of the liquid crystal panel 13.

Here, the second gamma correction unit 123 includes, for example, a second gamma correction LUT that is referred to when the input gradation value D is converted into the output gradation value F.

The second gamma correction LUT is an LUT obtained based on the power curve L2 and the second gamma characteristic curve L4 of the liquid crystal panel gamma characteristic. The second gamma correction LUT shows a relationship between the input gradation value D and the output gradation value F (the second corrected gradation value).

Figure 3:
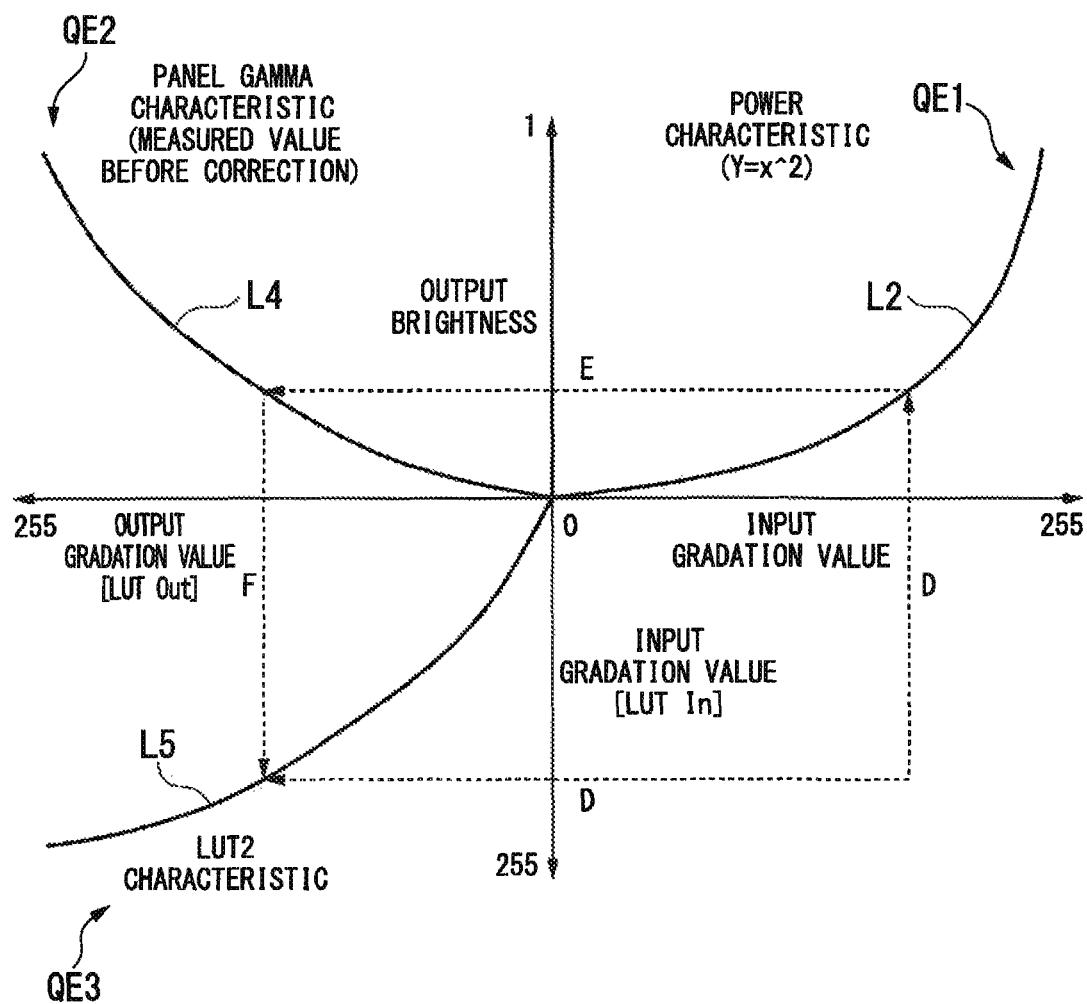
FIG. 3 is a conceptual diagram for describing gamma characteristics of a second gamma correction LUT.

FIG. 3 is a conceptual diagram which describes gamma characteristics of the second gamma correction LUT. In FIG. 3, a third quadrant QE3 indicates the gamma characteristics of the second gamma correction LUT. In addition, a first quadrant QE1 and a second quadrant QE2 are graphs for describing a method of generating the second gamma correction LUT.

The second gamma characteristic curve L4 is a curve that indicates the liquid crystal panel gamma characteristic shown in the second quadrant QE2. In a graph of the second gamma characteristic curve IA, the horizontal axis indicates the output gradation value F, and the vertical axis indicates a normalized brightness value E (a second normalized brightness value).

That is, the second gamma characteristic curve L4 is a curve that shows a brightness value (the normalized brightness value E) of a pixel displayed on the liquid crystal panel 13 with respect to the input gradation value D that is input.

The gamma characteristic curve L5 is generated using the power curve L2 in the first quadrant QE1 and the second gamma characteristic curve L4 of the liquid crystal panel gamma characteristic in the second quadrant QE2.

In FIG. 3, the graph of the power curve L2 in the first quadrant QE1 shows the input gradation value D on the horizontal axis and the normalized brightness value E (the second normalized brightness value) on the vertical axis.

That is, the power curve L2 in FIG. 3 is a curve of function that should be represented by the same Equation (3) as the power curve L2 of the first quadrant QD1 in FIG. 2.

The input gradation value D indicates a gradation value supplied to the second gamma correction unit 123. For example, a video gain corrected gradation value provided by the video gain correction unit 122 becomes the input gradation value D. The normalized brightness value E (the second normalized brightness value) indicates a brightness value obtained by normalizing brightness values less than the maximum brightness value by setting the maximum brightness value of each of the color components R, G, and B to 1. The maximum brightness value is a brightness value at the maximum gradation value 255 when the color components R, G, and B have 256 gradations.

The normalized brightness value E is obtained as a brightness value corresponding to the input gradation value D on the power curve L2. x in Equation (3) described above is the input gradation value D of the pixel of a video signal supplied to the second gamma correction unit 123, as described above.

Here, by substituting the input gradation value D for the power root x in Equation (3), the normalized brightness value E (second normalized brightness value) is obtained as the power value of the power function. That is, on the first gamma characteristic curve L1 of the user setting gamma characteristic, the normalized brightness value E is obtained as a normalized brightness value that is a result of performing gamma correction on the input gradation value D.

That is, by setting the input gradation value D as the power root of a power function of the power curve L2, the normalized brightness value E is obtained as the power value of a power function corresponding to this power root.

As a result, on the power curve L2, the input gradation value D can be converted into the normalized brightness value E of the power value as the power root of the power function, and the normalized brightness value E can be easily obtained based on the input gradation value D.

In the graph of the second gamma characteristic curve L4 in the second quadrant QE2, the horizontal axis indicates the output gradation value F, and the vertical axis indicates the normalized brightness value E (second normalized brightness value). The normalized brightness value E on the second gamma characteristic curve L4 is a measurement value obtained by measuring a brightness value when each output gradation values F is input using an optical measuring instrument in a configuration of only the liquid crystal panel 13 and in a state of no correction.

As a result, the gamma characteristic curve L5 is obtained as a curve which shows a relationship between the input gradation value D and the output gradation value F obtained by the processing described above when the input gradation value D is input.

That is, the output gradation value F corresponding to the same brightness value as the normalized brightness value E of the first gamma characteristic curve L1 is obtained from the graph of the second gamma characteristic curve L4.

According to the processing described above, the liquid crystal panel 13 displays an image according to a display characteristic corresponding to the user setting gamma characteristic.

In the video gain correction unit 122, correction of color temperature, adjustment of white point due to a change with time, adjustment of light emission unevenness, limitation of maximum brightness, and the like are performed by adjusting the gradation value in each pixel of the color components RGB.

In the video gain correction, the processing of color adjustment is performed by, for example, setting an adjustment ratio k1 ($0 \leq k1 \leq 1$), which is a ratio to the brightness value at the time of no correction, multiplying a gradation value x of a value with no correction by it, and calculating k1*x as a video gain corrected gradation value.

In the present embodiment, when color adjustment is performed, the adjustment ratio k1 is used as a constant by which the output gradation value C supplied from the first gamma correction unit 121 is multiplied.

Then, when the adjustment ratio k2 that adjusts a brightness of a screen is input, the following identical equation is established because the output gradation value C is the power root obtained from the power function.

$$(k1*x)^n = (k1)^n f(x) = k2 f(x)$$

In the identical equation described above, since f(x) is a brightness value and a brightness value f(x) is multiplied by the adjustment ratio k2, an adjusted brightness value is k2f(x). In addition, since the brightness value is obtained as the power value of the power function, the brightness value when the gradation value x is multiplied by the adjustment ratio k1 is obtained as a power value $(k1*x)^n$. Then, since a power function of the brightness value is $f(x)=x^n$, the brightness value is expressed as $(k1*x)^n = (k1)^n f(x)$.

For this reason, when adjustment ratios k2r, k2g, and k2b are set as constants for adjusting the brightness (brightness of the screen) of the target color components R, G, and B by a user, when the video gain corrected gradation values of the color components R, G, and B are obtained, adjustment ratios k1r, k1g, and k1b by which the gradation values are multiplied are obtained by the following Equation (4).

$$k1r = (k2r)^{1/n}, k1g = (k2g)^{1/n}, k1b = (k2b)^{1/n} \quad (4)$$

For example, if a user wants to set the brightness of a color component R to 50% of the brightness with no correction, the user inputs 0.5 as the adjustment ratio k2r.

For this reason, when the power n of the power function is set to 2, an adjustment ratio used for video gain correction is obtained as $k1r = (k2r)^{1/2} = (0.5)^{1/2} \approx 0.707$ for the color component R according to Equation (4).

Then, if the gradation characteristics after the video gain correction unit 122 are expressed as the function f(x), the brightness value Y of the screen after color adjustment is f(k1*x). Here, x is a gradation value and k1 is an adjustment ratio.

In addition, since the gradation characteristics are a power function having power characteristics, the brightness value Y can be expressed as $(k1*x)^n$ by Equation (3).

As a result, the equation described above that represents the brightness value Y will be transformed to $Y=(k1*x)^n = (k1)^n*(x)^n = (k1)^n f(x)$.

Figure 9:
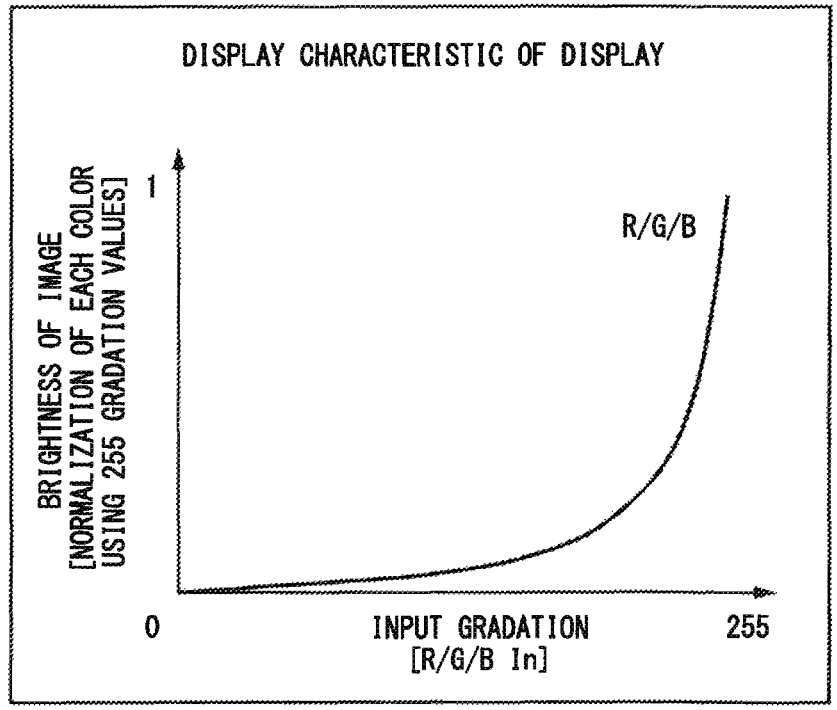
FIG. 9 is a diagram which shows a graph of gamma (gradation) characteristics in display characteristics of a display device.

Therefore, there are constants k1 ($=(k2)^{1/n}$) and k2 that satisfy $(k1*x))^n = k2 f(x)$, and the adjustment ratio k2 can be arbitrarily set by a user or the like as a constant. This maintains characteristics shown in FIG. 9 that each of the same gradation values in the color components RGB after color adjustment has the same screen brightness (a normalized brightness value).

Figure 10:
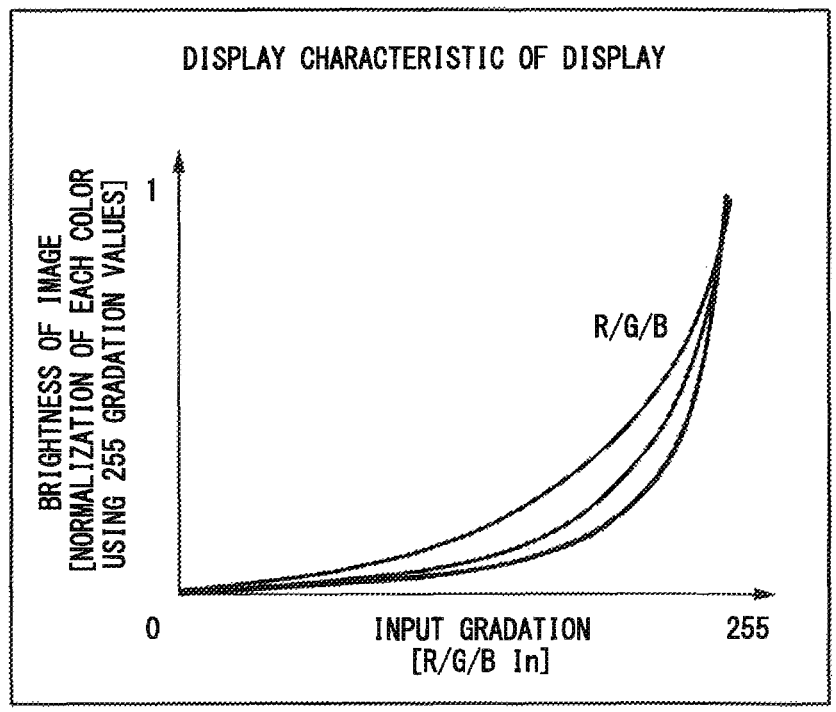
FIG. 10 is a diagram which shows the graph of gamma (gradation) characteristics in the display characteristics of the display device.

For this reason, in the present embodiment, when the brightness changes in gray color as in Patent Document 1, and each of the color components RGB has the same gradation value, coloring due to different screen brightness (normalized brightness values) as shown in FIG. 10 does not occur.

In addition, in the present embodiment, a simple power function that is generally used in mathematics and programming is used as the power function of Equation (3).

For this reason, it is possible to calculate mutual conversion between the adjustment ratio k2 and the adjustment ratio k1 used for video gain correction, and a brightness value (normalized brightness value) indicating screen brightness characteristics when the adjustment ratio k1 is used at high speed by using an equation (simple power function) without using a gamma correction LUT or the like.

In addition, in the present embodiment, the second gamma correction unit 123 uses the video gain corrected gradation value input from the video gain correction unit 122 as the input gradation value D, and obtains the output gradation value F using the first gamma correction LUT.

That is, the second gamma correction unit 123 inputs the video gain corrected gradation value (the output gradation value C multiplied by the adjustment ratio k1 ($=(k2)^{1/n}$)) as the input gradation value D.

As a result, the second gamma correction unit 123 uses the output gradation value C multiplied by the adjustment ratio k1 ($=(k2)^{1/n}$) as the input gradation value D, and obtains the output gradation value F by referring to the first gamma correction LUT.

As a result, in the present embodiment, each time the adjustment ratio k2 is input, the video gain correction unit 122 calculates the adjustment ratio k1 based on the supplied adjustment ratio k2.

However, in the present embodiment, by substituting the video gain corrected gradation value (k1*x) into the equation (3) as the input gradation value D, there is no need to rewrite the second gamma correction LUT or the like each time the adjustment ratio k2 is input as in Patent Document 2 to obtain the normalized brightness value E.

For this reason, in the present embodiment, since the gamma correction LUT is not rewritten, there is no need to reconfigure the gamma correction LUT as in Patent Document 2 each time color adjustment is performed, and a calculation load can be reduced.

Therefore, in the present embodiment, a display image corresponding to the adjustment ratio k2 supplied for color adjustment can be produced by following an operation in color adjustment in real time.

As a result, in the present embodiment, when color adjustment of the display screen is performed, it is not necessary to rewrite the gamma correction LUT each time the adjustment ratio k2 is supplied, flickering of the screen or noise such as display of unnecessary colors does not occur on the display screen as in Patent Document 2.

In addition, in the present embodiment, it is possible to perform color adjustment (including white point adjustment) that follows an operation of a user for color adjustment in real time without delaying it, and to adjust colors to the colors desired by the user at high speed, compared to the conventional example.

FIGS. 4A through 4E are conceptual diagrams which describe gamma correction and color adjustment processing by the display data processing device 12 of the present embodiment.

Figure 4:
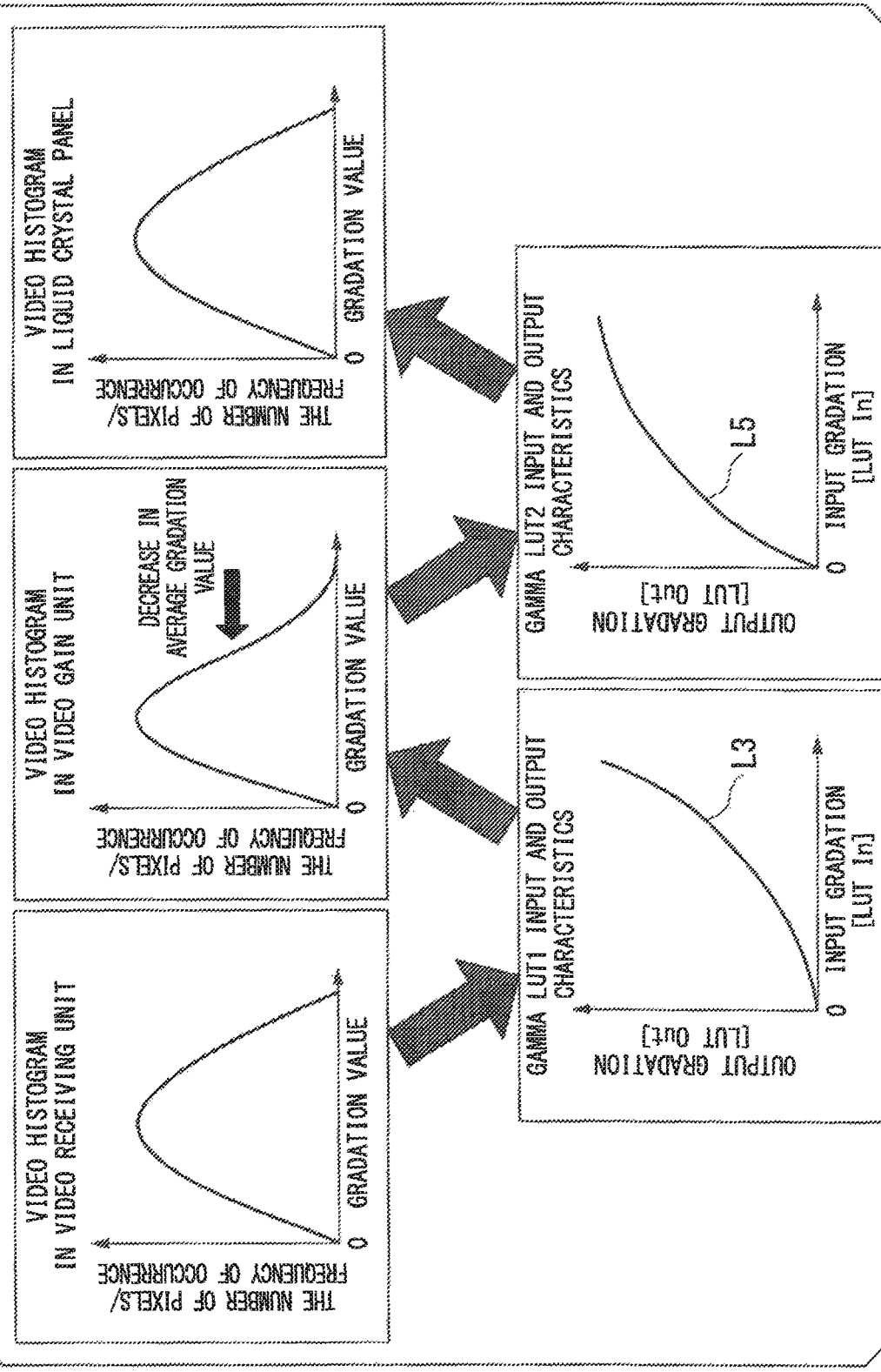
FIGS. 4A through 4E are conceptual diagrams for describing gamma correction and color adjustment processing by a display data processing device 12 of the present embodiment.

FIG. 4A is a histogram which shows the number of pixels (or the frequency of occurrence) of gradation values in each frame of a video signal supplied to the video receiving unit 11 in the configuration shown in FIG. 1. In FIG. 4A, the horizontal axis indicates the gradation value, and the vertical axis indicates the number of pixels in a corresponding gradation. The histogram in FIG. 4A shows the shape of a normal distribution.

FIG. 413 shows gamma characteristics (the gamma characteristic curve L3 in FIG. 2) of the first gamma correction LUT used for gamma correction in the first gamma correction unit 121. In the graph in FIG. 43, the horizontal axis indicates a gradation value that is input (the input gradation value A in FIG. 2), and the vertical axis indicates a gradation value (the output gradation value C in FIG. 2) that is corrected and output.

In addition, since the HDR standard characteristics such as user setting gamma characteristics are converted by the power characteristics (power function) of the power curve L2, the shape is closer to a straight line than the gamma characteristic curve in FIG. 13B.

That is, in the graph of FIG. 4B, the gamma characteristics (the gamma characteristic curve L3) of the first gamma correction LUT have the correspondence relationship between an input gradation and an output gradation value in a more linear shape, compared to the gamma characteristic curve of FIG. 133.

For this reason, in the present embodiment, unlike the curve in FIG. 133, the gamma characteristic curve L3 of the first gamma correction LUT corrects the gradation values in all the gradation areas, including the gradation values in the dark area, at substantially the same ratio.

FIG. 4C shows a histogram of the gradation values of a video signal corrected by the gamma characteristic curve L3 of the first gamma correction LUT in FIG. 4B. In FIG. 4C, the horizontal axis indicates a gradation value, and the vertical axis indicates the number of pixels (or the frequency of occurrence) in the gradation value.

The histogram shown in FIG. 4C is a histogram which shows the number of pixels for each gradation value in the frame of the video signal supplied to the second gamma correction unit 123 in FIG. 1.

FIG. 4C is a histogram of a frame resulting from correction of the gradation values by the gamma characteristic curve (the gamma characteristic curve L3) of FIG. 4B. Compared to the histogram of FIG. 4A, the histogram of FIG. 4C has a shape in which a center of the distribution shifts toward a lower gradation value as a whole, and is biased towards the dark area.

However, the first gamma characteristic of FIG. 4B has a shape closer to a straight line than that of FIG. 13B. For this reason, the histogram of FIG. 4C shows that each gradation value is maintained without the center of the distribution being biased toward the dark area as in FIG. 13C.

FIG. 4D shows the gamma characteristic of the second gamma correction LUT used by the second gamma correction unit 123 for gamma correction (the gamma characteristic curve L5 in FIG. 3). In the graph in FIG. 4D, the horizontal axis indicates an input gradation value that is input (the input gradation value D in FIG. 3), and the vertical axis indicates an output gradation value that is corrected and output (output gradation value F in FIG. 3). Here, the gamma characteristic curve L5 of the second gamma correction LUT sets the normalized brightness value E of the gamma characteristic of the liquid crystal panel 13 (the gamma characteristic curve L4 in FIG. 3) as the power value of the power function of a power curve (the power curve L2 in FIG. 3).

For this reason, the gamma characteristic curve L5 in FIG. 4D has a shape closer to a straight line than an inverse characteristic of the liquid crystal panel gamma characteristic in FIG. 13D.

For this reason, unlike the curve in FIG. 13D, all gradation values in the gradation areas, including the gradation values in the dark area, are corrected at approximately the same ratio by the gamma characteristic curve L5 in FIG. 4D.

FIG. 4E shows a histogram of the gradation values of a video signal corrected by the gamma correction curve L5 (the second gamma correction LUT) in FIG. 4D. The histogram of FIG. 4E is a histogram which shows the number of pixels (or the frequency of occurrence) of the gradation values in a frame of the video signal supplied to the liquid crystal panel 13 in the configuration shown in FIG. 1. In FIG. 4E, the horizontal axis indicates a gradation value, and the vertical axis indicates the number of pixels (or the frequency of occurrence).

FIG. 4E is a histogram approximating to the histogram in FIG. 4A as a result of correction by the gamma correction curve L5 (the second gamma correction LUT) in FIG. 4D and is a histogram in a shape closer to that of normal distribution as a whole.

As shown in FIG. 4B, the gamma characteristics (the gamma characteristic curve L3) of the first gamma correction LUT are close to a straight line. For this reason, compared to the histogram of FIG. 13C, the histogram of FIG. 4C has fewer pixels that are quantized and corrected as specific gradation values in the dark area, and there is no bias that a center of distribution shifts to the dark area.

Similarly, as shown in FIG. 4D, the gamma characteristics (the gamma characteristic curve L5) of the second gamma correction LUT are also close to a straight line.

For this reason, in the present embodiment, since the second gamma correction is close to a straight line, fewer gradation values are quantized as specific gradation values in the dark area, as shown in the histogram of FIG. 13C of Patent Document 3.

Figure 12:
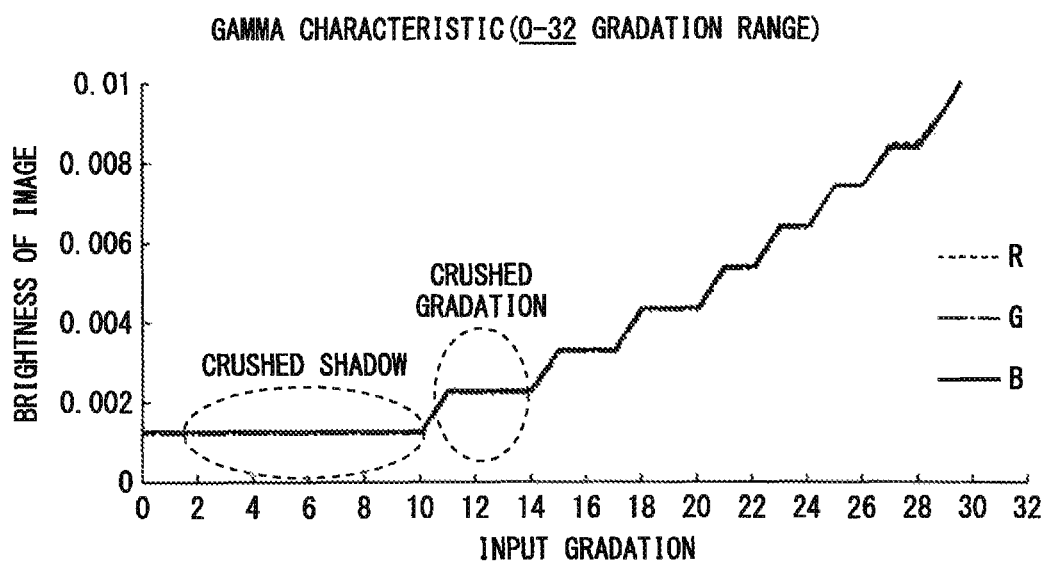
FIG. 12 is a diagram which shows the graph of gamma (gradation) characteristics in the display characteristics of the display device.

As a result, in the present embodiment, the gradation values of the dark area are not quantized as a specific gradation value as in Patent Document 3, so that neither the crushed shadows nor crushed gradation (skipped gradation) occurs in the gradation values of the dark area as shown in FIG. 12.

Figure 11:
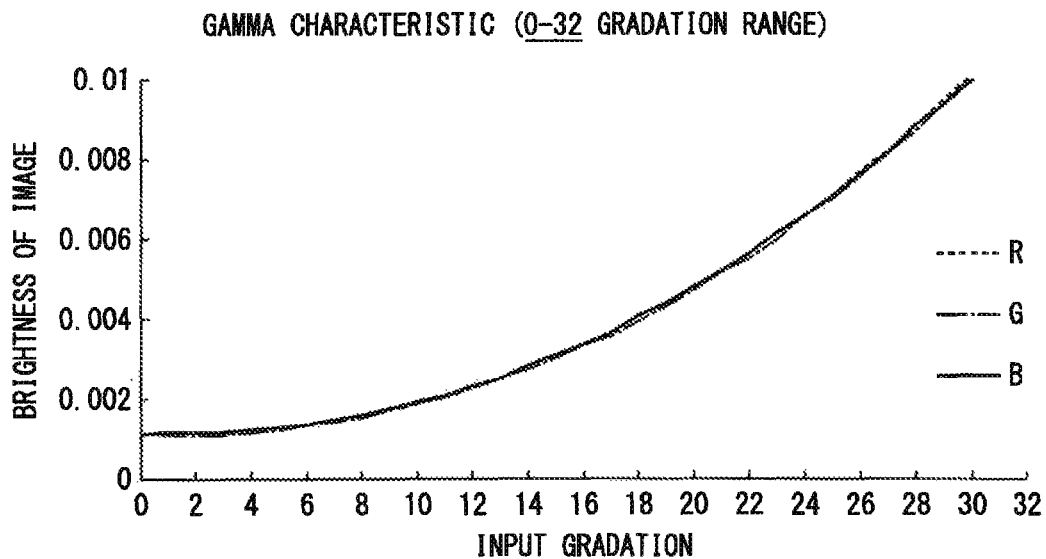
FIG. 11 is a diagram which shows the graph of gamma (gradation) characteristics in the display characteristics of the display device.

As a result, according to the present embodiment, as shown in FIG. 11, even after gamma correction or color adjustment is performed, the gradation values in the dark area also have continuous changes in gradation values similar to those in the other gradation areas.

Figure 5:
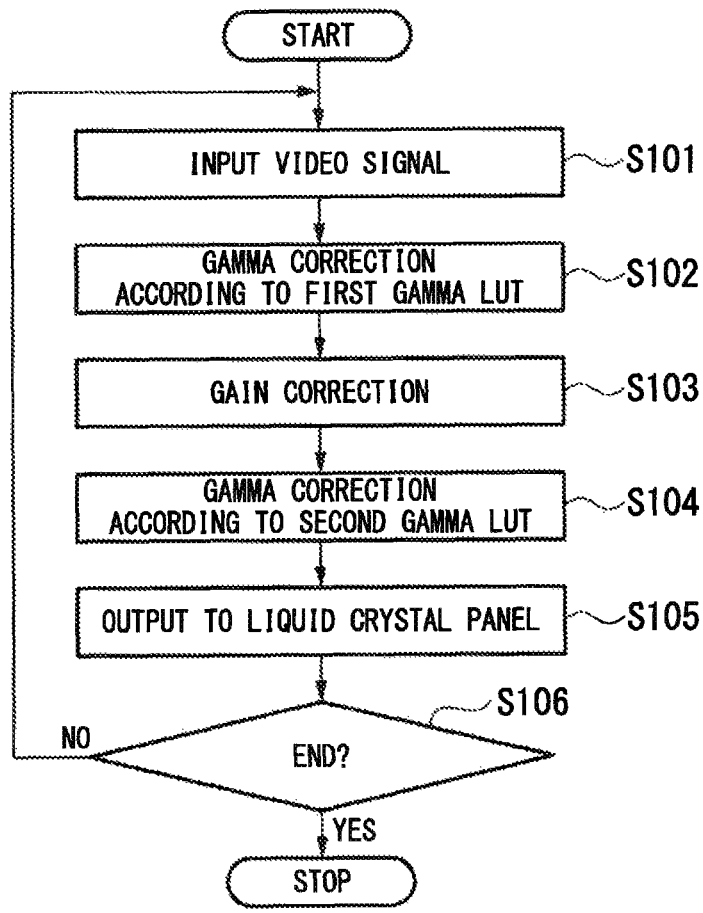
FIG. 5 is a flowchart for describing operations of the gamma correction and color adjustment processing by the display data processing device 12 of the present embodiment.

FIG. 5 is a flowchart which describes operations of gamma correction and color adjustment processing by the display data processing device 12 of the present embodiment. In the following description, the power of a power function is set to be 2, that is, a power function is set to the square function.

Step S101: The video receiving unit 11 outputs pixels of a frame of a video signal supplied from an external device to the display data processing device 12.

The first gamma correction unit 121 inputs gradation values of the pixels of the video signal from the video receiving unit 11 as the input gradation value A.

Step S102: The first gamma correction unit 121 refers to the first gamma correction LUT written in its internal storage unit in advance. As already described, the first gamma correction LUT is generated based on the first gamma characteristic curve L1 of the user setting gamma characteristic and the power curve L2 of the square function.

The first gamma correction unit 121 sets the gradation values (the color components R, G, and B) of the pixels in the frame of the video signal as the input gradation value A, and reads the output gradation value C corresponding to the input gradation value A from the first gamma correction LUT.

That is, the output gradation value C is obtained by using the normalized brightness value B (a first normalized brightness value) of the first gamma characteristic curve L1 corresponding to the input gradation value A set as the power value of the square function, and the first gamma correction LUT set as the power root of a square function corresponding to this power value.

In the present embodiment, processing of correcting the input gradation value A described above to the output gradation value C can be performed at high speed only by referring to the first gamma correction LUT.

Then, the first gamma correction unit 121 outputs the output gradation value C read from the first gamma correction LUT, corresponding to the input gradation value A, to the video gain correction unit 122 as a result of the first gamma correction.

Step S103: The video gain correction unit 122 obtains the adjustment ratios k1r, k1g, and k1b of the color components R, G, and B by which the output gradation value C that is input is multiplied when the video gain corrected gradation value is obtained.

For this reason, the video gain correction unit 122 calculates the square root of each of the adjustment ratios k2r, k2g, and k2b with respect to brightness supplied from the external device.

Then, the video gain correction unit 122 performs color adjustment by multiplying the gradation value of each of the color components R, G, and B by each of the calculated adjustment ratios k1r(=(k2r)$^{1/2}$), k1r(=(k2r)$^{1/2}$) and k1r(=(k2r)$^{1/2}$).

The video gain correction unit 122 outputs the gradation values of the color components R, G, and B on which color adjustment is performed to the second gamma correction unit 123 as video gain corrected gradation values.

Step S104: The second gamma correction unit 123 acquires the video gain corrected gradation value from the video gain correction unit 122.

The second gamma correction unit 123 uses the input video gain corrected gradation value as the input gradation value D, and refers to the second gamma correction LUT written in its internal storage unit in advance. The second gamma correction LUT is generated based on the power curve L2 of the square function and the second gamma characteristic curve L4 of the second gamma characteristic of the liquid crystal panel 13.

That is, the second gamma correction LUT of the present embodiment is generated such that the input gradation value D is set to the power root of the square function, a power value corresponding to this power root is set to the normalized brightness value E (a second normalized brightness value), and a gradation value of the second gamma correction curve L4 corresponding to this normalized brightness value E is set to the output gradation value F.

Then, the second gamma correction unit 123 sets the video gain corrected gradation value (the gradation values of the pixels in the frame of the video signal on which video gain correction is performed) as the input gradation value D, refers to the second gamma correction LUT, and reads the output gradation value F corresponding to the input gradation value D.

As a result, in the present embodiment, processing of setting the video gain corrected gradation value that is input after the video gain correction described above as the input gradation value D, and correcting it to the output gradation value F corresponding to the gamma characteristic of the liquid crystal panel 13 can be performed at high speed by referring to the second gamma correction LUT.

Step S105: The second gamma correction unit 123 outputs the output gradation value F read from the second gamma correction LUT to the liquid crystal panel 13 as a result of the second gamma correction. Here, the second gamma correction unit 123 acquires the output gradation value F as the gradation value of the pixel of a video signal displayed on the liquid crystal panel 13 according to the second gamma correction LUT including the second gamma characteristic of the liquid crystal panel 13.

Then, the liquid crystal panel 13 displays the pixel of the video signal as an image on the display screen according to each output gradation value F supplied from the second gamma correction unit 123.

As a result, the liquid crystal panel 13 can display an image that corresponds to the user setting gamma characteristic and on which color adjustment such as white point adjustment is performed.

Step S106: The second gamma correction unit 123 determines whether to end display data processing.

The second gamma correction unit 123 determines, for example, whether the image display system 1 has been powered off.

The second gamma correction unit 123 ends the processing when the display data processing is finished, and advances the processing to step S101 when the display data processing is not finished.

Figure 6:
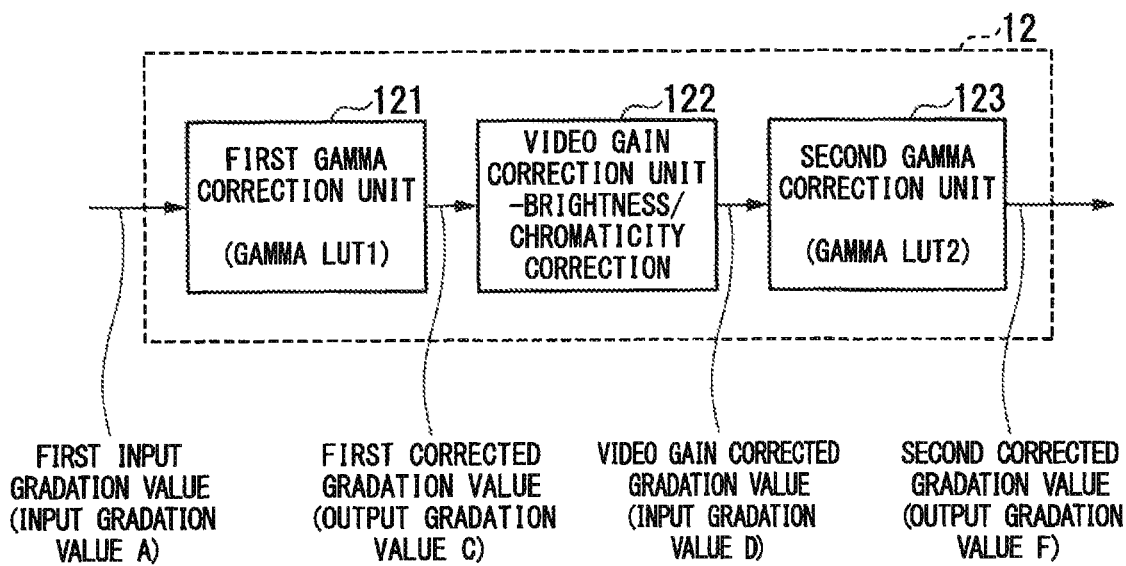
FIG. 6 is a diagram for describing a concept of the embodiment of the present invention.
Figure 7:
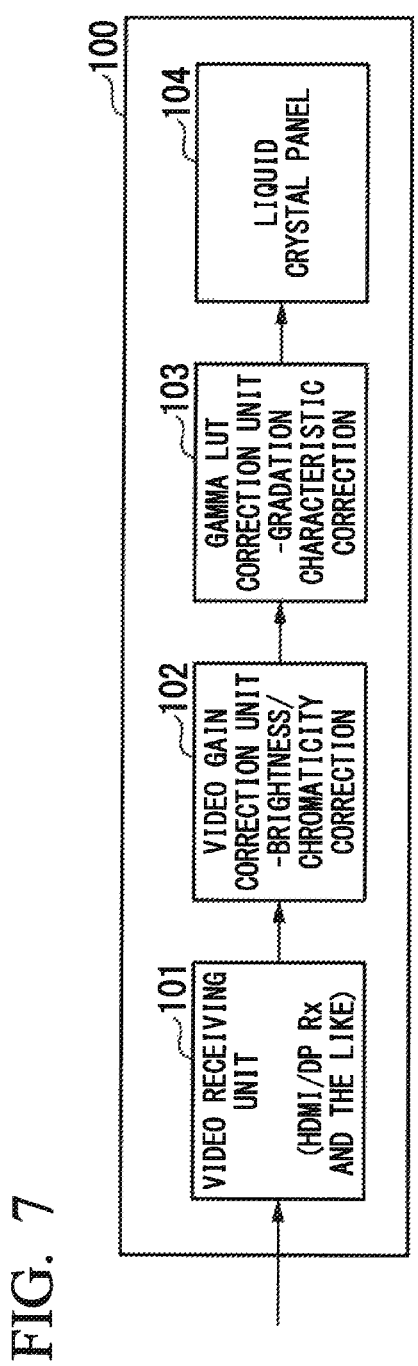
FIG. 7 is a block diagram which shows a configuration of a display device in Patent Document 1.
Figure 8:
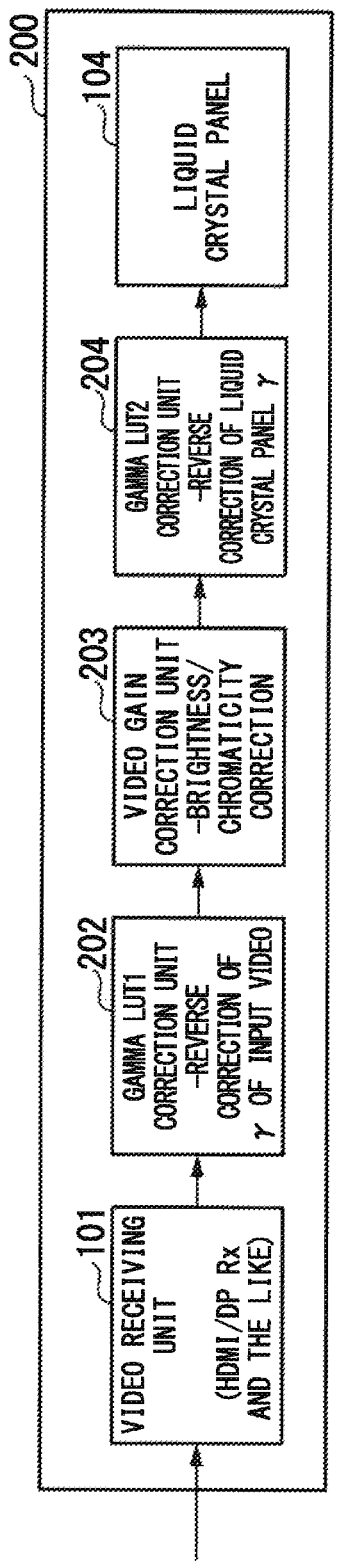
FIG. 8 is a block diagram which shows a configuration of a display device in Patent Document 3.

FIG. 6 is a diagram which describes a concept of the embodiment of the present invention. The display data processing device 12 includes the first gamma correction unit 121, the video gain correction unit 122, and the second gamma correction unit 123. Here, the first gamma correction unit 121 includes the first gamma correction LUT. The second gamma correction unit 123 includes the second gamma correction LUT.

The display data processing device 12 performs color adjustment on gradation values of pixels of a frame image of an input video signal, and outputs the adjusted gradation values to a display device, for example, a liquid crystal panel.

The first gamma correction unit 121 sets, based on first composite correction information (gamma characteristics in the first gamma correction LUT) according to a first gamma characteristic indicating a correspondence relationship between a first input gradation value (the input gradation value A) and a first normalized brightness value (the normalized brightness value B) and a first power function indicating a correspondence relationship between a first normalized brightness value and a first corrected gradation value (the output gradation value C), a gradation value as a first input gradation value and converts it into a first corrected gradation value.

The video gain correction unit 122 performs color adjustment on the first corrected gradation value according to video gain correction and outputs the result as a video gain corrected gradation value.

A second gamma correction unit sets, based on second composite correction information according to a second power function having the same power as the first power function, which indicates a correspondence relationship between a second input gradation value (the input gradation value D) and a second normalized brightness value (the normalized brightness value E), and a second gamma characteristic indicating a correspondence relationship between the second normalized brightness value and a second corrected gradation value (a second output gradation value), the video gain corrected gradation value as the second input gradation value and converts the second input gradation value into the second corrected gradation value.

With the configuration of FIG. 6, it is possible to provide the display data processing device 12 that smoothly changes the color of the display screen and does not allow image quality deterioration to occur on the display screen by improving the speed of color adjustment on the display screen when color adjustment such as white point adjustment is performed.

In addition, in the image display system 1 of FIG. 6, the display data processing device 12 is installed as an independent computer system, but it may also be configured to be included in any one of the video receiving unit 11 and the liquid crystal panel 13 shown in FIG. 1. Then, control may also be performed to cause the display data processing device 12 to realize a function of performing the first gamma correction, the video gain correction, and the second gamma correction. The "computer system" herein is assumed to include OS or hardware such as peripheral devices.

Although the embodiment of the present invention has been described in detail with reference to the drawings, the specific configuration is not limited to this embodiment, and includes designs within a range not departing from the gist of the present invention.

INDUSTRIAL APPLICABILITY

The image display system and image display method described above are effective in realizing a configuration for suppressing display image deterioration in Patent Documents 1, 2, and 3 when the first gamma correction and the second gamma correction are performed not only on liquid crystal panels but also on display devices such as CRTs, plasma displays and projectors.

REFERENCE SIGNS LIST

1 Image display system
11 Video receiving unit
12 Display data processing device
13 Liquid crystal panel
121 First gamma correction unit
122 Video gain correction unit
123 Second gamma correction unit

What is claimed is:

1. A display data processing device that performs color adjustment on gradation values of pixels of a frame image of an input video signal and outputs the adjusted gradation values to a display device, comprising:
 a first gamma correction unit configured to, based on first composite correction information according to a first gamma characteristic indicating a correspondence relationship between a first input gradation value and a first normalized brightness value and a first power function indicating a correspondence relationship between the first normalized brightness value and a first corrected gradation value, set the gradation value as the first input gradation value and to convert the first input gradation value into the first corrected gradation value;
 a video gain correction unit configured to perform color adjustment on the first corrected gradation value according to video gain correction and to output the result as a video gain corrected gradation value; and
 a second gamma correction unit configured to, based on second composite correction information according to a second power function having the same power as the first power function, which indicates a correspondence relationship between a second input gradation value and a second normalized brightness value, and a second gamma characteristic indicating a correspondence relationship between the second normalized brightness value and a second corrected gradation value, set the video gain corrected gradation value as the second input gradation value and to convert the second input gradation value into the second corrected gradation value.

2. The display data processing device according to claim 1,
 wherein the first gamma correction unit sets the first normalized brightness value corresponding to the first input gradation value in the first gamma characteristic as a power value of the first power function and a power root corresponding to the power value as the first corrected gradation value, and obtains the first corrected gradation value for the first input gradation value according to a correspondence relationship between the first input gradation value and the first corrected gradation value, and
 the second gamma correction unit sets the video gain corrected gradation value to a power root of the second power function and a power value corresponding to the power root to the second normalized brightness value in the second gamma characteristic, and obtains the second corrected gradation value corresponding to the video gain corrected gradation value according to a correspondence relationship between the video gain corrected gradation value and the second corrected gradation value.

3. The display data processing device according to claim 2,
 wherein the first gamma correction unit obtains the first normalized brightness value corresponding to the first input gradation value in the first gamma characteristic, obtains the power root corresponding to the first normalized brightness value in the first power function, includes a first correction lookup table generated as a correspondence relationship between the first input gradation value and the first corrected gradation value that is the power root, and outputs the first corrected gradation value with reference to the first correction lookup table when the first input gradation value is input, and the second gamma correction unit obtains a power value of the second power function when the video gain corrected gradation value is set to a power root, sets the power value as the second normalized brightness value in the second gamma characteristic, includes a second correction lookup table generated as a correspondence relationship between the video gain corrected gradation value and the second normalized brightness value, and outputs the second corrected gradation value with reference to the second correction lookup table when the video gain corrected gradation value is input.

4. The display data processing device according to claim 1,
wherein, when a power in the first power function and the second power function is n, $1<n\leq3$.

5. The display data processing device according to claim 1,
wherein a first adjustment ratio by which the first corrected gradation value is multiplied is a power root of a second adjustment ratio that adjusts a designated brightness in the processing of video gain correction.

6. The display data processing device according to claim 1,
wherein the first gamma characteristic is a user setting gamma characteristic that is arbitrarily set, and the second gamma characteristic is a gamma characteristic of a display device that displays a second corrected gradation value.

7. An image display system comprising:
the display data processing device according to claim 1, and the display device configured to display an image according to the second corrected gradation value, wherein the second gamma characteristic is a gamma characteristic of the display device.

8. A display data processing method for performing color adjustment on gradation values of pixels of a frame image of an input video signal and outputting the adjusted gradation value to a display device, the method comprising:

a first gamma correction process of setting, by a first gamma correction unit, based on first composite correction information according to a first gamma characteristic indicating a correspondence relationship between a first input gradation value and a first normalized brightness value and a first power function indicating a correspondence relationship between the first normalized brightness value and a first corrected gradation value, the gradation value as the first input gradation value and converting the first input gradation value into the first corrected gradation value;

a video gain correction process of a video gain correction unit performing color adjustment on the first corrected gradation value according to video gain correction by a video gain correction unit and outputting the adjusted gradation value as a video gain corrected gradation value; and a second gamma correction process of setting, by a second gamma correction unit, based on second composite correction information according to a second power function having the same power as the first power function, which indicates a correspondence relationship between a second input gradation value and a second normalized brightness value, and a second gamma characteristic indicating a correspondence relationship between the second normalized brightness value and a second corrected gradation value, the video gradation value as the second input gradation value and converting the second input gradation value into the second corrected gradation value.

* * * * *